(12) United States Patent
Shen et al.

(10) Patent No.: US 7,480,401 B2
(45) Date of Patent: Jan. 20, 2009

(54) METHOD FOR LOCAL SURFACE SMOOTHING WITH APPLICATION TO CHEST WALL NODULE SEGMENTATION IN LUNG CT DATA

(75) Inventors: Hong Shen, Princeton, NJ (US);
 Bernhard Göbel, Gräfeling (DE);
 Benjamin Odry, West New York, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1146 days.

(21) Appl. No.: 10/870,304

(22) Filed: Jun. 17, 2004

(65) Prior Publication Data
 US 2005/0001832 A1     Jan. 6, 2005

Related U.S. Application Data

(60) Provisional application No. 60/480,654, filed on Jun. 23, 2003.

(51) Int. Cl.
 *G06K 9/00*    (2006.01)
(52) U.S. Cl. ........................................ 382/131
(58) Field of Classification Search ................. 382/128, 382/131
 See application file for complete search history.

(56) References Cited

U.S. PATENT DOCUMENTS

| | | | | |
|---|---|---|---|---|
| 5,531,520 A | * | 7/1996 | Grimson et al. | 382/131 |
| 6,639,685 B1 | * | 10/2003 | Gu et al. | 356/603 |
| 7,024,027 B1 | * | 4/2006 | Suri et al. | 382/130 |

* cited by examiner

*Primary Examiner*—Tom Y Lu
(74) *Attorney, Agent, or Firm*—Donald B. Paschburg; F.Chau & Associates, LLC

(57) ABSTRACT

We present an algorithm for local surface smoothing in a defined Volume of Interest ("VOI") cropped from three-dimensional ("3D") volume data, such as lung computer tomography ("CT") data. Because the VOI is generally a smooth and piecewise linear surface, the inclusion of one or more bumps may suggest an abnormality. In lung CT data, for example, such bumps can be nodules that are grown from the chest wall. The nodules may represent a possibility of lung cancer. Through surface smoothing, potential pathologies are separated from the surrounding anatomical structures. For example, nodules may be segmented from the chest wall. The separated pathologies can be analyzed as diagnostic evidence.

19 Claims, 2 Drawing Sheets ically a crucial step for further analysis. This includes quantification, feature measurements, classification, and nodule growth rate determination. The possible pathological regions are often connected with the surrounding anatomical structures. Segmentation of such regions from the connected anatomies is a challenging problem, primarily because there is little different between the intensities of the pathology and the anatomy. Therefore, shape analysis is often performed to separate the pathologies instead of simple threshold based techniques.

METHOD FOR LOCAL SURFACE SMOOTHING WITH APPLICATION TO CHEST WALL NODULE SEGMENTATION IN LUNG CT DATA

CROSS-REFERENCE TO RELATED APPLICATIONS

This application claims priority to U.S. Provisional Application No. 60/480,654, which was filed on Jun. 23, 2003, and which is fully incorporated herein by reference.

BACKGROUND OF THE INVENTION

1. Field of the Invention

The present invention relates to the field of computer imaging, and, more particularly, to local surface smoothing in a defined Volume of Interest ("VOI") cropped from a three-dimensional volume data.

2. Description of the Related Art

Modern advances in medical imaging equipment have provided greater efficiency and higher capability for screening, diagnosis and surgery of various kinds of diseases. Three-dimensional ("3D") imaging modalities, such as multi-slice computer tomography ("CT") scanners, produce a large amount of digital data that is generally difficult and tedious for a human (e.g., a physician) to interpret without additional aid. Computer-aided diagnosis ("CAD") systems play a critical role in aiding the human, especially in the visualization, segmentation, detection, registration, and reporting of medical pathologies.

One of the more critical CAD tasks includes the screening and early detection of various types of cancer from a volume data (e.g., a CT volume data). For instance, lung cancer is the leading cause of deaths among all cancers in the United States and around the world. A patient diagnosed with lung cancer has an average five-year survival rate of only 14%. On the other hand, if lung cancer is diagnosed in stage I, the patient's expected five-year survival rate dramatically increases to between 60 and 70 percent. Other cancers, such as colon cancer, have also shown a decrease in mortality rates resulting from the early detection and removal of cancerous tumors. Unfortunately, existing methods generally do not detect characteristic symptoms of various cancers until the advanced stages of the disease. Therefore, a primary goal in advancing preventive cancer screening is to provide for earlier detection of the characteristic symptoms.

Among various CAD functionalities for cancer screening, automatic segmentation of suspicious regions of interest is typically a crucial step for further analysis. This includes quantification, feature measurements, classification, and nodule growth rate determination. The possible pathological regions are often connected with the surrounding anatomical structures. Segmentation of such regions from the connected anatomies is a challenging problem, primarily because there is little different between the intensities of the pathology and the anatomy. Therefore, shape analysis is often performed to separate the pathologies instead of simple threshold based techniques.

Pathologies are typically spherical or hemispherical in geometric shape. In many cases, these sphere-like pathologies are attached to linear or piece-wise linear surfaces. For example, in lung cancer screening, one of the major goals is to detect, segment and monitor the growth of small tumors (i.e., nodules) within the lung regions. The lungs contain complex structures of branching vessels and airways. Lung nodules may be found throughout the lungs, including attached to pleura or vessels. The segmentation of a nodule from the pleura is a challenging task. The nodule attached to pleura may be the shape of a hemisphere bump on a relatively smooth and linear chest wall surface. For another example, in colon cancer screening, small tumors attached to the inner colon surfaces (i.e., polyps) are the major potential pathologies to detect, segment, and monitor. Like the nodule, a polyp may also be the shape of a hemisphere bump sitting on the relatively smooth and piecewise linear cylindrical inner surface of the colon.

The segmentation of potential pathologies, such as pleura-attached nodules and the colon-attached polyps, from the surrounding anatomical structures, can be viewed as a local surface-smoothing problem. When a user clicks on a nodule or polyp, a volume of interest ("VOI") can be defined around the user's click point. The CAD system may fix the size of the VOI to contain the largest nodule. The inner surfaces of the pleura and the colon are mostly smooth and piecewise linear, with the nodule or the polyp being the only abrupt discontinuity of smoothness and piecewise linearity. Surface smoothing removes the bump on the surface, and the difference between the smoothed VOI and the original VOI will be the segmented nodule or the polyp.

An exemplary nodule segmentation method will now be described. In a user-defined click point, the method performs a region grow from the center and obtains the foreground voxels. The foreground structure comprises a nodule candidate, and, optionally, attached vessels and a portion of the pleura. If the method determines that there is a pleura (or chest wall) inside the VOI, a chest wall exclusion procedure is activated. The chest wall is smoothed using a rolling ball-based method. The remaining foreground structure is named a structure of interest ("SOI"). Shape analysis is performed to obtain the core of the SOI and the center of the core. A 3D spherical template is applied to the core. The method iteratively expands the template, and computes a cross correlation curve. The template is optimized based on the analysis of the cross correlation curve. The resulting segment is the portion of the SOI that overlaps with the optimal spherical template.

A key step for the above segmentation of pleura-attached nodules is the exclusion of the chest wall section in the binary VOI. The above exemplary method as well as other known methods are 2D-based. The VOI is considered to be a set of 2D axial slice images. On each slice, the binary image of foreground regions is traced and the contour is analyzed using curvature information. The rolling ball method assumes a piecewise linear contour with abrupt bumps to be removed. The rolling ball is placed at each high-curvature point of the contour, and, if there is more than one intersection with the contour, the contour section between the intersection points are replaced by a line.

The exemplary nodule segmentation method described above is, among other things, imprecise, error-prone in noisy situations, slow, and dependent on input locations.

SUMMARY OF THE INVENTION

In one aspect of the present invention, a computer-implemented method of local surface smoothing of a three-dimensional ("3D") binary volume of interest ("VOI") is provided. The VOI comprises a plurality of 3D surface points. The method includes identifying a projection plane; obtaining a two-dimensional ("2D") projection image by projecting the plurality of 3D surface points onto the projection plane; determining a plurality of intensities of the projection image, the plurality of intensities comprising distances from the plurality of 3D surface points to the projection plane; identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region; obtaining fitted function values by fitting a third order polynomial to the intensities of the points outside and around the bump region; replacing the intensities of the points inside the bump region with the fitted function values; and projecting the fitted function values inside the bump region on the 2D projection image back to the 3D VOI.

In another aspect of the present invention, a machine-readable medium having instructions stored thereon for execution by a processor to perform method of local surface smoothing of a three-dimensional ("3D") binary volume of interest ("VOI") is provided. The VOI comprises a plurality of 3D surface points. The method includes identifying a projection plane; obtaining a two-dimensional ("2D") projection image by projecting the plurality of 3D surface points onto the projection plane; determining a plurality of intensities of the projection image, the plurality of intensities comprising distances from the plurality of 3D surface points to the projection plane; identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region; obtaining fitted function values by fitting a third order polynomial to the intensities of the points outside and around the bump region; replacing the intensities of the points inside the bump region with the fitted function values; and projecting the fitted function values inside the bump region on the 2D projection image back to the 3D VOI.

In yet another aspect of the present invention, a system of local surface smoothing of a three-dimensional ("3D") binary volume of interest ("VOI") is provided. The VOI comprises a plurality of 3D surface points. The system includes means for identifying a projection plane; means for obtaining a two-dimensional ("2D") projection image by projecting the plurality of 3D surface points onto the projection plane; means for determining a plurality of intensities of the projection image, the plurality of intensities comprising distances from the plurality of 3D surface points to the projection plane; means for identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region; means for obtaining fitted function values by fitting a third order polynomial to the intensities of the points outside and around the bump region; means for replacing the intensities of the points inside the bump region with the fitted function values; and means for projecting the fitted function values inside the bump region on the 2D projection image back to the 3D VOI.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1A:
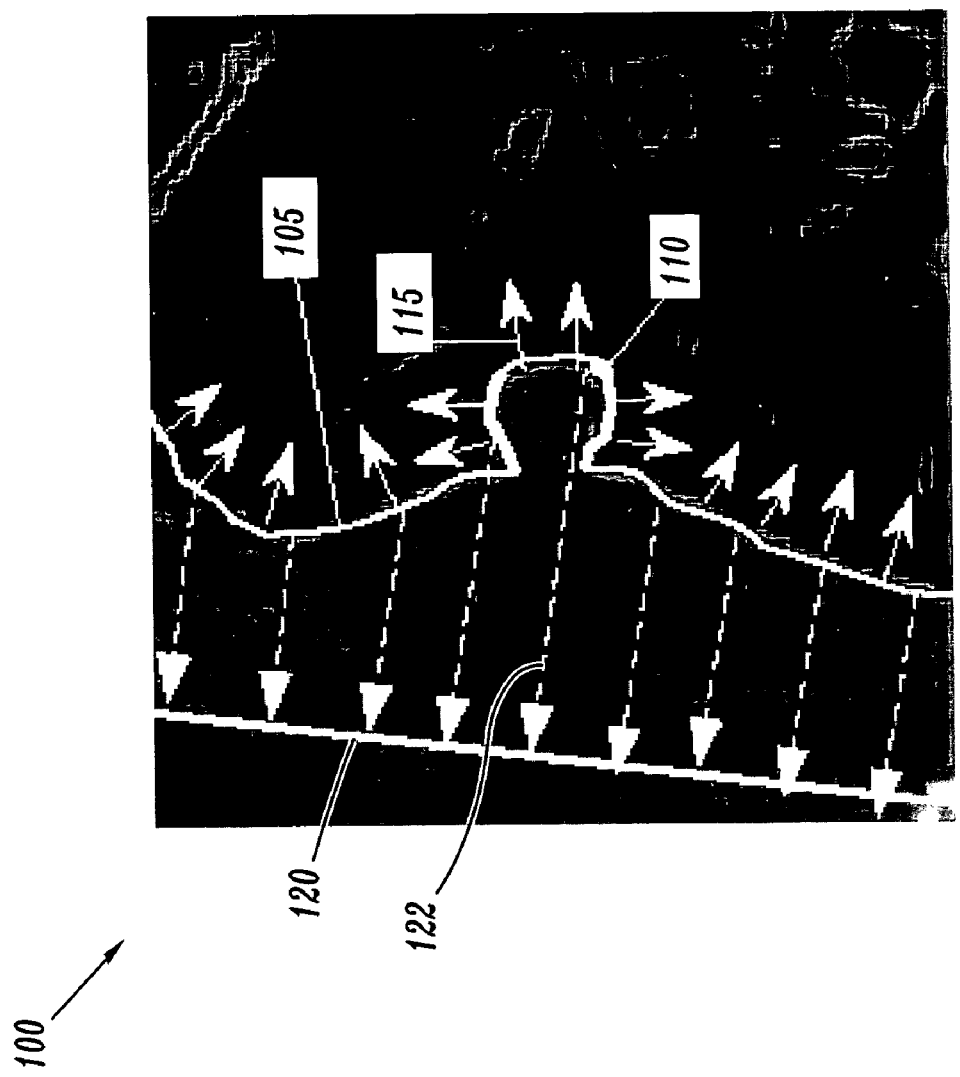
FIG. 1(a) depicts a slice of an exemplary volume of interest ("VOI"), in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present an processor-based method for local surface smoothing in a defined Volume of Interest ("VOI") cropped from three-dimensional ("3D") volume data, such as lung computer tomography ("CT") data. Because the VOI is generally a smooth and piecewise linear surface, the inclusion of one or more bumps may suggest an abnormality. In lung CT data, for example, such bumps can be nodules that are grown from the chest wall. The nodules may represent a possibility of lung cancer. Through surface smoothing, the bumps are separated from the surrounding anatomical structures. For example, nodules may be segmented from the chest wall. The separated bumps can be analyzed as diagnostic evidence.

The processor-based local surface smoothing method described herein (hereinafter "the method") is 3D-based and region-based. It provides an alternative to current two-dimensional ("2D")-based methods. It is understood that the goal of both 2D and 3D-based methods are to remove a chest wall from a defined VOI. The primary difference between 2D and 3D methods is that in the 2D method, the chest wall is removed slice by slice, while in the 3D method, the chest wall is removed as a whole. Region-based means that the voxels are extracted together as a region. This is differentiated from a contour-based method, which first extracts the boundary contours of the region, and then fills the voxels inside the contour.

For simplicity of description, the exemplary application described herein will be based on lung nodule segmentation. However, it should be understood that the method can be applied to any of a variety of other applications known to those skilled in the art, such as polyp segmentation. The method has the advantage of high consistency and robustness, and is useful in a segmentation module of a computer-aided diagnosis ("CAD") system.

Before the application of the method, the foreground structure is segmented from a grayscale VOI by region growing from the center point of the VOI. Therefore, the method uses a binary VOI, in which the surface to be smoothed separates the VOI into two parts. The foreground includes both the chest wall and the attached nodule, as shown in FIG. 1(a). A goal of the method is to segment the chest wall. The segmented chest wall can be used to obtain the structure of interest ("SOI") by subtracting the resulting VOI from the original VOI.

The method first computes the local mean orientation of the chest wall surface. A plane parallel to the local mean orientation is then determined and all the foreground voxels are projected onto this plane to obtain a 2D image. The pixel value of the 2D image is the largest distance of the foreground voxels that are in the projection path to the projection plane. A bump on the surface would thus correspond to a high intensity region in the 2D image. This region is then localized and replaced by a polynomial interpolation of the neighbor pixels outside the region. This interpolation is then inversely projected back to the 3D VOI, and the bump voxels are identified and removed.

In the evaluation of a segmentation method, consistency is an important criterion. Since the segmentation is initialized by a user click, it is crucial that the segmentation result is independent of the click point as long as the click point is inside the nodule. For the user, it is hard to understand why two clicks lead to two different segmentation results even if the difference is very insignificant. Therefore, there should ideally be zero difference between the volume measurement values from two clicks on the same nodule. While this may be difficult, if not impossible, in a continuous world, it is achievable in discrete volume data. In the following, we discuss the method in detail while addressing the issue of consistency.

A. The Projection Plane and the Consistency Issue

The normal of the projection plane should be closest to the surface normal of most points on the chest wall surface to obtain a good projection quality. The location of the plane itself is generally of no importance and can be placed in a variety of locations as contemplated by those skilled in the art. For example, we can position the plane through an arbitrary point deep inside the chest wall.

We compute the gradients of each surface point. The mean of the gradients is naturally taken as the normal of the projection surface. However, the set of surface points obviously depends on the VOI. For even a slightly shifted VOI, the surface point set and the mean of surface normal will be changed, which will lead to inconsistent projection and segmentation results. Robust estimation techniques may be used to compute the normal, but that may not produce consistent values.

To achieve zero variation of the volume measurement, the set of the surface points should be exactly the same regardless of the click point. By using a fixed reference point as the center of the VOI, a cropped VOI will always be the same regardless of the click point, and the segmentation results will always be the same.

With this in mind, we observe the gradient directions of all chest wall surface points as well as nodule surface points, as shown in FIG. 1(a). A chest wall surface 100 is outlined with the white contour 105. Since the surface 100 is piecewise linear, and the nodule is an abrupt discontinuity of this linearity, the side areas of the nodule surface 110 (represented by the thick white outline) will have very different surface normals from the rest of chest wall surface points. Using histogram analysis, for example, we can find the value range of the normals pertaining to the chest wall surface points, and pick out the "abnormal" points as the side area points of the nodule surface.

We assume that the nodule is always within the VOI. Also, the shift of the VOI is not very large because the click point is within the nodule. Therefore, the set of the side area points of the nodule surface is mostly the same. We set the fixed reference point as the centroid of the side nodule surface points. This reference point is mostly independent of the VOI shift. It is possible that the result set of side area points of the nodule surface varies slightly, but because the centroid is computed as a discrete point location, a small error will not cause the centroid to jump to a different point location. This is where the consistency issue is handled in the method. To eliminate the possibility that a faraway chest wall surface point is taken as one of the side area points, connected component analysis is applied so that only the nodule surface points are collected.

We crop the VOI around this fixed reference point, and the mean of the gradient of the surface points excluding the side area points of the nodule surface is taken as the normal of the projection plane. The plane is marked as the white line in FIG. 1(a).

B. Distance Map of the Foreground Voxels

For every foreground point, the distance to the projection plane is computed. The 3D point location is also mapped onto a location in the projection plane. To form a 2D image, the distance value of the 3D point is stored as the image value of the mapped 2D location, provided that either it is the first time that 2D location is mapped, or the distance value is larger than the previously stored value. Therefore, for each location on this image, the [intensity] value is the largest distance of all foreground points in the projection path. An example of such image is shown in FIG. 1(b).

C. Identification of the 2D Projected Bump Region

On the projection image, the mapped nodule surface points can be identified as a bright region. This is because the largest distances of the nodule points are greater than the rest of the chest wall points. To segment out the projected nodule region, we compute the 2D gradient edge image, as shown in FIG.

1(c). On the gradient image, we analyze the gradient profiles and find the gradient threshold.

The projection of the reference point is used as a reference point on the 2D image. From this point, we reach out for the edge contour. Region growing followed by filling and dilation give a slightly larger region covering the mapped nodule.

D. Replace of 2D Bump Region

Figure 1D:
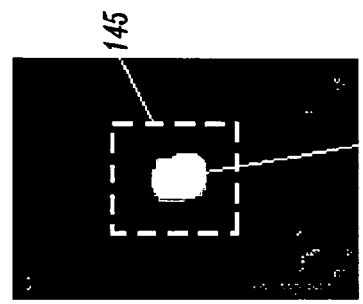
FIG. 1(d) depicts a segmented and dilated 2D nodule area of the VOI of FIG. 1(c) with a dotted square representing the region in which a third order polynomial is fitted, in accordance with one embodiment of the present invention.
Figure 1F:
FIG. 1(f) depicts the 3D nodule points of FIG. 1(a) removed by projection back to the VOI of FIG. 1(a), in accordance with one embodiment of the present invention.
Figure 1C:
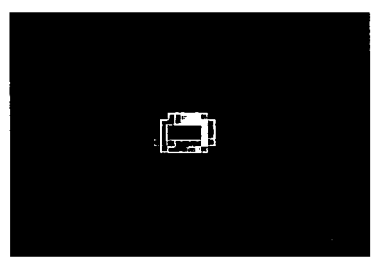
FIG. 1(c) depicts a gradient map of the projected 2D image of FIG. 1(b), in accordance with one embodiment of the present invention.

A square region 145 centered at the projected reference point 140 is defined as shown in FIG. 1(d). It is significantly larger than the dilated nodule region to include an abundant number of points. A third order polynomial is fitted to all the points inside this region excluding the nodule region:

$$f(x,y) = a_0 + a_1 x + a_2 y + a_3 x^2 + a_4 y^2 + a_5 xy + a_6 x^3 + a_7 x^2 y + a_8 xy^2 + a_9 y^3 \quad (1)$$

To compute the polynomial coefficients, a set of linear equations is constructed by entering the intensity values I and the 2D locations (x, y) of each point to the left and right hand side of equation (1). The total number of equations equals the number of points used to fit the function. Since there are always more points than the number of coefficients, this is an under-constraint problem. Therefore, we use a Least Median Square ("LMS") method and Singular Value Decomposition ("SVD") to find a best solution.

Figure 1E:
FIG. 1(e) depicts the intensities of the 2D nodule area of FIG. 1(d) being replaced by fitted function values, in accordance with one embodiment of the present invention.
Figure 1B:
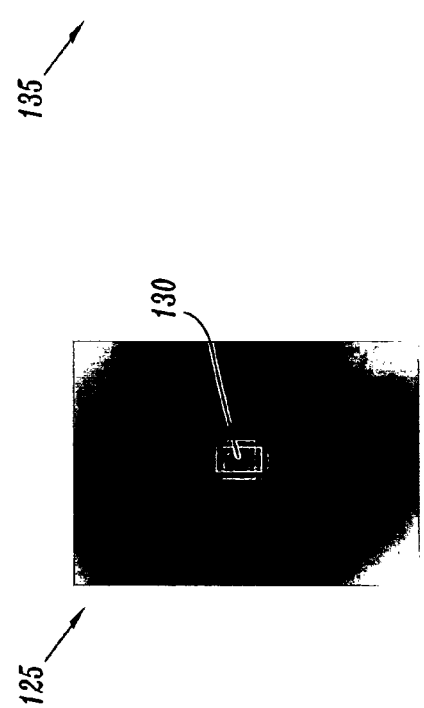
FIG. 1(b) depicts a projected 2D image of the VOI of FIG. 1(a), in accordance with one embodiment of the present invention.

Once the coefficients are determined, the distance values of the mapped nodule region are replaced by the values computed from equation (1), resulting in a "smoothed" projection image. An example of this is shown in FIG. 1(e).

F. Mapping of Replaced Bump Region to VOI

When the projection 2D image was created, as described above, we recorded the mapped points. That is, for each 2D location on the image, we recorded all the 3D foreground point locations that are mapped to this 2D location. We also recorded the distance values of each 3D point.

For each 2D location on the projection image whose intensity is modified by the fitting procedure, we retrieve all the 3D points that are associated with it. We then erase any 3D point whose distance value is greater than the new intensity value of the 2D image. Hence, we erase all nodule points on this projection path. When all the 2D locations are processed, a new section of chest wall surface is defined, and the distances of the new surface points are actually the interpolations of the neighboring chest wall surface points.

To summarize FIGS. 1(a) to 1(f), FIG. 1(a) shows a slice of a VOI 100. The white outline 105 marks the 3D surface of the chest wall, and the thicker portion 110 of the outline 105 represents the set of 3D side area points from the nodule surface ("3D nodule points"). The solid line arrows 115 on the outline 105 show the surface normals. The straight line 120 represents the projection plane. The dotted line arrows 122 illustrate the projection paths from the surface of the chest wall 105 to the projection plane 120.

FIG. 1(b) shows a projected 2D image 125 of the VOI 100 shown in FIG. 1(a). The bright region 130 maps to the 3D nodule points 110 of FIG. 1(a). FIG. 1(c) shows a gradient map 135 of the projected 2D image 125 of FIG. 1(b). FIG. 1(d) shows a segmented and dilated 2D nodule area 140, which maps to the nodule area 110 of FIG. 1(a), with a dotted square 145 representing the region in which a third order polynomial is fitted. FIG. 1(e) shows the intensities (i.e., value of each voxel) of the 2D nodule area 145 of FIG. 1(d) being replaced by fitted function values. FIG. 1(f) shows the 3D nodule points 110 of FIG. 1(a) removed by projection back to the VOI 100 of FIG. 1(a).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-implemented method of local surface smoothing of a three-dimensional ("3D") binary volume of interest ("VOI"), wherein the VOI comprises a plurality of 3D surface points, the method comprising:

identifying a projection plane;

obtaining a two-dimensional ("2D") projection image by projecting the plurality of 3D surface points onto the projection plane;

determining a plurality of intensities of the projection image, the plurality of intensities comprising distances from the plurality of 3D surface points to the projection plane;

identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region;

obtaining fitted function values by fitting a third order polynomial to the intensities of the points outside and around the bump region;

replacing the intensities of the points inside the bump region with the fitted function values; and projecting the fitted function values inside the bump region on the 2D projection image back to the 3D VOI.

2. The computer-implemented method of claim 1, wherein the step of identifying a projection plane comprises:

extracting the plurality of 3D surface points from the VOI;

determining a gradient for each of the plurality of 3D surface points;

determining a normal of the projection plane based on the gradients of the plurality of 3D surface points; and determining a location of the projection plane.

3. The computer-implemented method of claim 2, wherein the step of extracting the plurality of 3D surface points from the VOI comprises:

extracting a consistent set of the plurality of 3D surface points from the VOI.

4. The computer-implemented method of claim 3, wherein the step of extracting a consistent set of the plurality of 3D surface points from the VOI comprises:

computing surface normals of all surface points on the VOI;

identifying which of the plurality of surface points belong to a 3D bump region by evaluating the surface normals;

determining a center of the identified surface points; and moving the VOI to the center of the identified surface points.

5. The computer-implemented method of claim 1, wherein the step of obtaining a 2D projection image comprises:

computing plurality of distances for the plurality of 3D surface points to the projection plane;

forming the 2D projection image, wherein the intensity of each pixel on the 2D projection image corresponds to one of the plurality of distances; and choosing the largest distance of the plurality of distances if there is more than one point in the plurality of 3D surface points that correspond to the same pixel on the 2D projection image.

6. The computer-implemented method of claim 1, wherein the step of identifying a bump region comprises:
computing a gradient image from 2D projection image;
detecting a boundary contour of the bump region from the gradient image;
filling the boundary contour to obtain the bump region; and
performing dilation to enlarge the bump region.

7. The computer-implemented method of claim 1, wherein the step of obtaining fitted function values comprises:
determining polynomial coefficients by incorporating the locations of the points outside and around the bump region.

8. The computer-implemented method of claim 1, wherein the step of projecting the fitted function values inside the bump region comprises:
mapping a point into a 3D voxel in the 3D VOI for each 2D pixel on the 2D projection image;
identifying a projection path between the 3D point and 2D location in the 2D projection image; and
removing the 3D surface points that are on the projection path and whose distances to the projection plane are larger than the intensity of the 2D pixel on the 2D projection image.

9. The computer-implemented method of claim 1, wherein obtaining fitted function values by fitting a third order polynomial to intensities of the points outside and around the bump region comprises obtaining fitted function values by fitting $f(x,y)=a_0+a_1x+a_2y+a_3x^2+a_4y^2+a_5xy+a_6x^3+a_7x^2y+a_8xy^2+a_9y^3$ to intensities of the points outside and around the bump region.

10. A computer-readable medium having program instructions stored thereon for execution by a processor to perform method of local surface smoothing of a three-dimensional ("3D") binary volume of interest ("VOI"), wherein the VOI comprises a plurality of 3D surface points, the method comprising:
identifying a projection plane;
obtaining a two-dimensional ("2D") projection image by projecting the plurality of 3D surface points onto the projection plane;
determining a plurality of intensities of the projection image, the plurality of intensities comprising distances from the plurality of 3D surface points to the projection plane;
identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region;
obtaining fitted function values by fitting a third order polynomial to the intensities of the points outside and around the bump region;
replacing the intensities of the points inside the bump region with the fitted function values; and
projecting the fitted function values inside the bump region on the 2D projection image back to the 3D VOI.

11. A computer-readable medium of claim 10, wherein the step of identifying a projection plane comprises:
extracting the plurality of 3D surface points from the VOI;
determining a gradient for each of the plurality of 3D surface points;
determining a normal of the projection plane based on the gradients of the plurality of 3D surface points; and
determining a location of the projection plane.

12. A computer-readable medium of claim 11, wherein the step of extracting the plurality of 3D surface points from the VOI comprises:
extracting a consistent set of the plurality of 3D surface points from the VOI.

13. A computer-readable medium of claim 12, wherein the step of extracting a consistent set of the plurality of 3D surface points from the VOI comprises:
computing surface normals of all surface points on the VOI;
identifying which of the plurality of surface points belong to a 3D bump region by evaluating the surface normals;
determining a center of the identified surface points; and
moving the VOI to the center of the identified surface points.

14. A computer-readable medium of claim 10, wherein the step of obtaining a 2D projection image comprises:
computing plurality of distances for the plurality of 3D surface points to the projection plane;
forming the 2D projection image, wherein the intensity of each pixel on the 2D projection image corresponds to one of the plurality of distances; and
choosing the largest distance of the plurality of distances if there is more than one point in the plurality of 3D surface points that correspond to the same pixel on the 2D projection image.

15. A computer-readable medium of claim 10, wherein the step of identifying a bump region comprises:
computing a gradient image from 2D projection image;
detecting a boundary contour of the bump region from the gradient image;
filling the boundary contour to obtain the bump region; and
performing dilation to enlarge the bump region.

16. A computer-readable medium of claim 10, wherein the step of obtaining fitted function values comprises:
determining polynomial coefficients by incorporating the locations of the points outside and around the bump region.

17. A computer-readable medium of claim 10, wherein the step of projecting the fitted function values inside the bump region comprises:
mapping a point into a 3D voxel in the 3D VOI for each 2D pixel on the 2D projection image;
identifying a projection path between the 3D point and 2D location in the 2D projection image; and
removing the 3D surface points that are on the projection path and whose distances to the projection plane are larger than the intensity of the 2D pixel on the 2D projection image.

18. A computer-readable medium of claim 10, wherein obtaining fitted function values by fitting a third order polynomial to intensities of the points outside and around the bump region comprises obtaining fitted function values by fitting $f(x,y)=a_0+a_1x+a_2y+a_3x^2+a_4y^2+a_5xy+a_6x^3+a_7x^2y+a_8xy^2+a_9y^3$ to intensities of the points outside and around the bump region.

19. A system of local surface smoothing of a three-dimensional ("3D") binary volume of interest ("VOI"), wherein the VOI comprises a plurality of 3D surface points, the system comprising:
means for identifying a projection plane;
means for obtaining a two-dimensional ("2D") projection image by projecting the plurality of 3D surface points onto the projection plane;

means for determining a plurality of intensities of the projection image, the plurality of intensities comprising distances from the plurality of 3D surface points to the projection plane;

means for identifying a bump region on the 2D projection image, wherein the plurality of 3D surface points comprises points outside and around the bump region and points inside the bump region, and wherein the plurality of intensities comprises intensities of the points outside and around the bump region and intensities of the points inside the bump region;

means for obtaining fitted function values by fitting a third order polynomial to the intensities of the points outside and around the bump region;

means for replacing the intensities of the points inside the bump region with the fitted function values; and means for projecting the fitted function values inside the bump region on the 2D projection image back to the 3D VOI.

* * * * *